(12) United States Patent
Lanciaux

(10) Patent No.: US 11,207,820 B2
(45) Date of Patent: Dec. 28, 2021

(54) CURVED DUCT, AND METHOD AND MACHINE FOR PRODUCING IT

(71) Applicant: Fran Lanciaux, Grand Rapids, OH (US)

(72) Inventor: Fran Lanciaux, Grand Rapids, OH (US)

(73) Assignee: Kingspan Insulation LLC, Atlanta, GA (US)

( * ) Notice: Subject to any disclaimer, the term of this patent is extended or adjusted under 35 U.S.C. 154(b) by 383 days.

(21) Appl. No.: 16/254,461

(22) Filed: Jan. 22, 2019

(65) Prior Publication Data

US 2019/0224905 A1 Jul. 25, 2019

Related U.S. Application Data

(60) Provisional application No. 62/619,963, filed on Jan. 22, 2018.

(51) Int. Cl.
| | |
|---|---|
| *B29C 53/40* | (2006.01) |
| *B29C 53/06* | (2006.01) |
| *B29C 67/20* | (2006.01) |
| *B29C 44/56* | (2006.01) |
| *B29C 65/00* | (2006.01) |
| *B29C 53/04* | (2006.01) |
| *B29C 53/38* | (2006.01) |
| *F24F 13/02* | (2006.01) |
| *F16L 13/10* | (2006.01) |
| *E04C 2/32* | (2006.01) |
| *B29K 105/04* | (2006.01) |

(52) U.S. Cl.
CPC ........ *B29C 53/063* (2013.01); *B29C 44/5627* (2013.01); *B29C 53/043* (2013.01); *B29C 53/382* (2013.01); *B29C 53/40* (2013.01); *B29C 66/5221* (2013.01); *B29C 67/20* (2013.01); *F16L 13/103* (2013.01); *F24F 13/0245* (2013.01); *B29K 2105/04* (2013.01); *E04C 2/328* (2013.01)

(58) Field of Classification Search
CPC ............................ F24F 13/0245; E04C 2/328
See application file for complete search history.

(56) References Cited

U.S. PATENT DOCUMENTS

| | | | | |
|---|---|---|---|---|
| 4,019,228 | A * | 4/1977 | Ozawa .................. | D02G 1/122 28/221 |
| 2014/0261846 | A1 * | 9/2014 | Lanciaux ............... | E04C 2/328 138/141 |
| 2020/0158372 | A1 * | 5/2020 | Bota ..................... | B21D 39/03 |

* cited by examiner

*Primary Examiner* — Nahida Sultana
*Assistant Examiner* — Debjani Roy
(74) *Attorney, Agent, or Firm* — Charles F. Charpie

(57) ABSTRACT

A duct that, in cross section, has one or more rounded portions is disclosed together with a method and a machine for producing it. The duct can be made from rigid foam panels with a facing on at east one side of the panels. A crimping element is used to form several substantially parallel indentations or crimps on a faced side of a panel, without breaching the facing, so that the crimped panel can be manipulated to form a section of duct with the crimps extending longitudinally. Depending on the number of crimps, the duct will appear more or less round in cross section although the crimped foam panels can be manipulated to have cross sections of different shapes such as oval. Adjacent duct sections may be joined, for example, with tape or bands, several of which are described.

18 Claims, 6 Drawing Sheets

CURVED DUCT, AND METHOD AND MACHINE FOR PRODUCING IT

Figure 1:
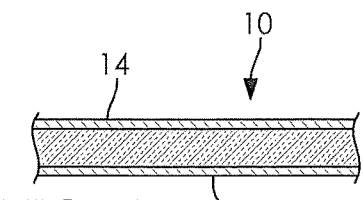

According to the invention, a panel of foam insulation is crimped and bent to produce a duct pre-form which can be manipulated easily to produce a round duct or a duct with rounded portions. In order to produce a duct which is lined, one face of the foam insulation panel should be covered with a facing material.

In one example of the invention, the foam insulation panel has a rigid foam core and facing layers on each face. Good results are achieved with rigid closed cell phenolic foam insulation panels with low vapor permeability aluminum foil facing, reinforced with a glass scrim and bonded to both sides of the panels. In another example of the invention, the foam insulation panel may be a rigid polyisocyanurate foam insulation panel with at least one facing layer. Suitable materials for facing layers include, but are not limited to foil, poly-foil, FSK. Facing layers may include glass mat for reinforcing the facing material. Other rigid foam panels may be used.

The duct pre-form is produced according to a method of the invention by feeding a foam insulation panel into a custom crimp bender having a flat plate die or a base roll, and a crimping element which may be a roll or a die or the like. Panels enter the bender and are crimped and, as they exit the bender, the crimped panel is fed into a curved receiver which helps maintain the duct preform in an arcuate shape. The bender may preferably include an articulating bender guide which exerts an upward force on the lower face of the foam insulation panel while the crimping element exerts a downward force on the opposite face. In a preferred embodiment, the face of the foam insulation panel that engages the crimping element is faced with a facing material which meets industry standards for indoor air ducts. The custom crimp bender should be set so that the force of the crimping element is enough to make an indentation in the foam core of the panel but not enough to breach the integrity of the facing layer so that duct made from the pre-form is lined with an acceptable material and so that no further lining is necessary to produce a finished duct.

BRIEF DESCRIPTION OF THE DRAWING FIGURES

Figure 2:
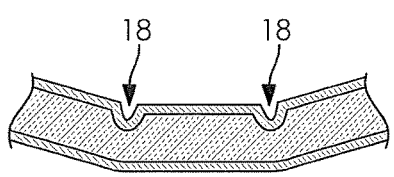
Figure 3:
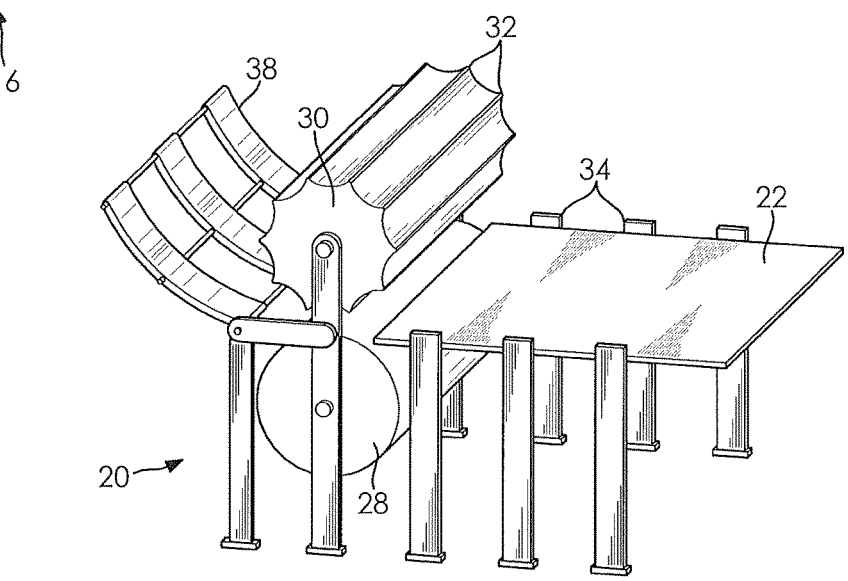
Figure 4:
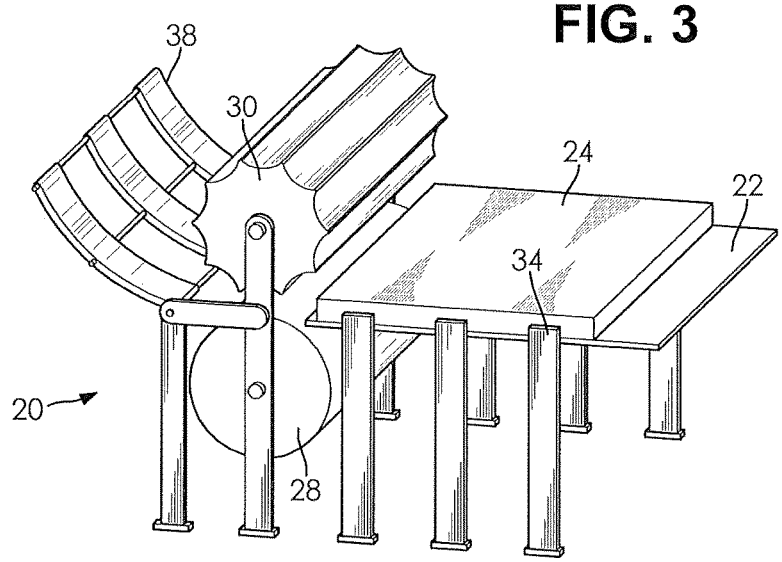
Figure 5:
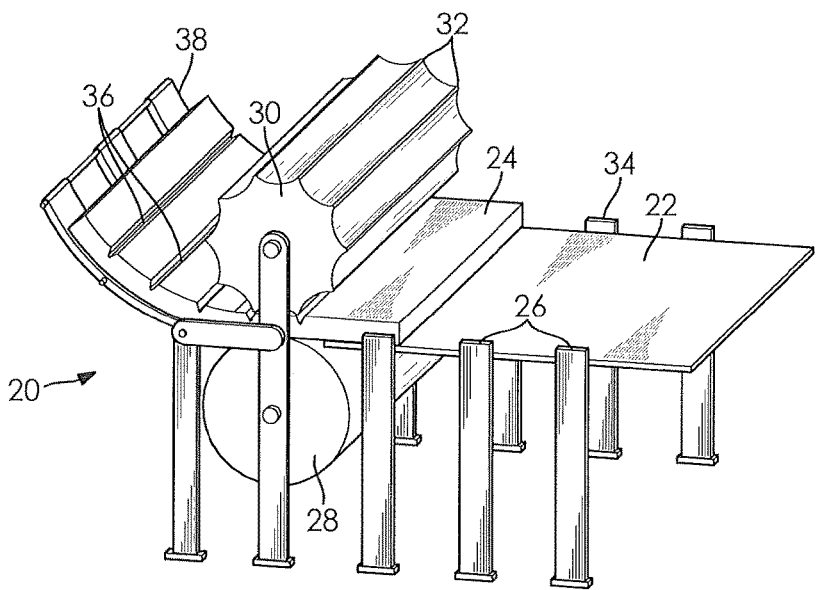
Figure 6:
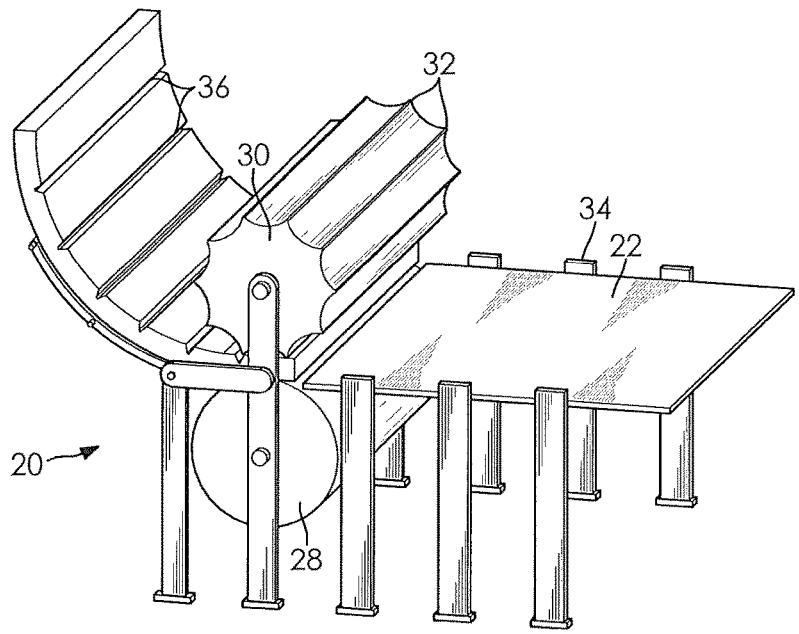
Figure 7:
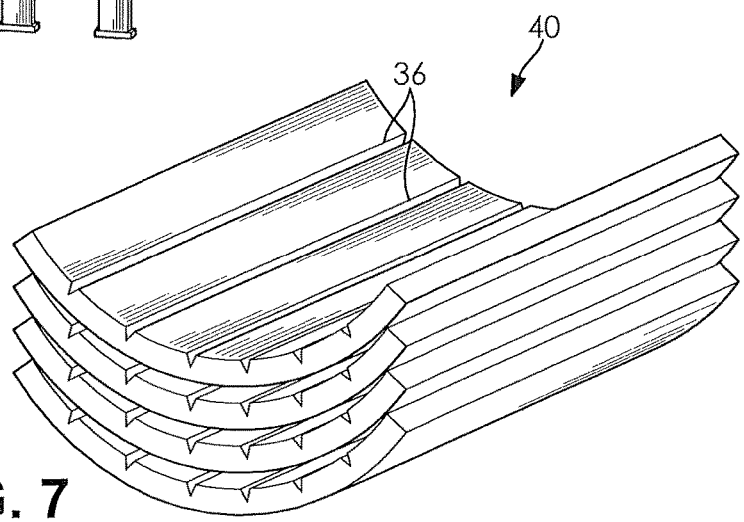
Figure 8:
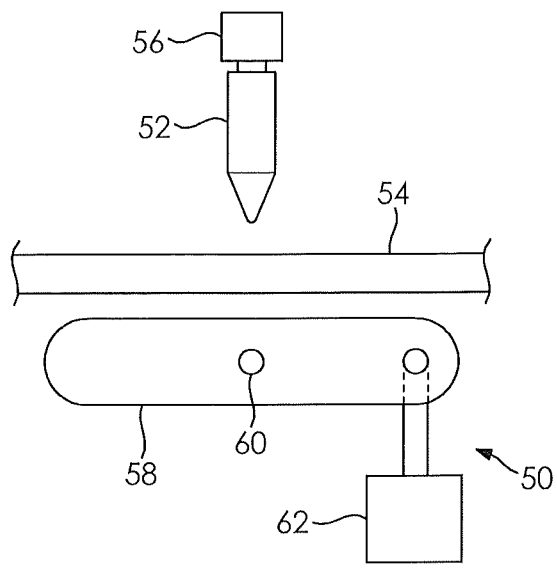
Figure 9:
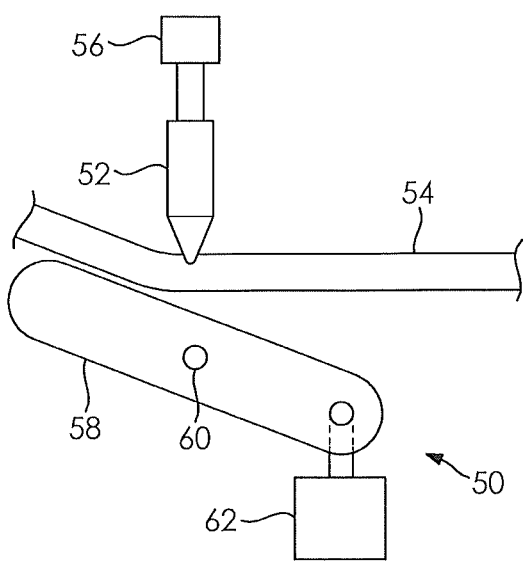
Figure 10:
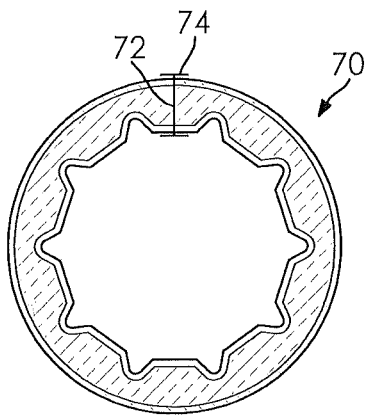
Figure 11:
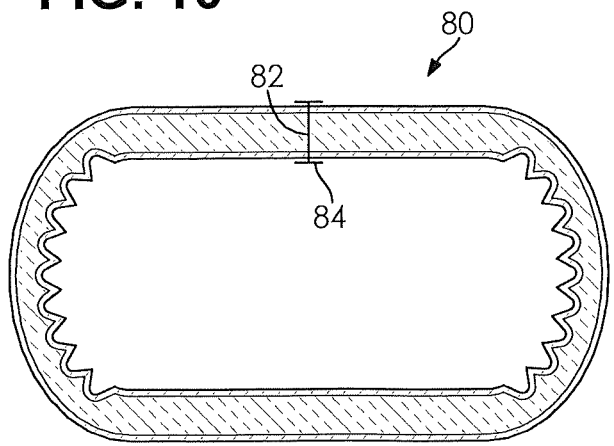
Figure 12:
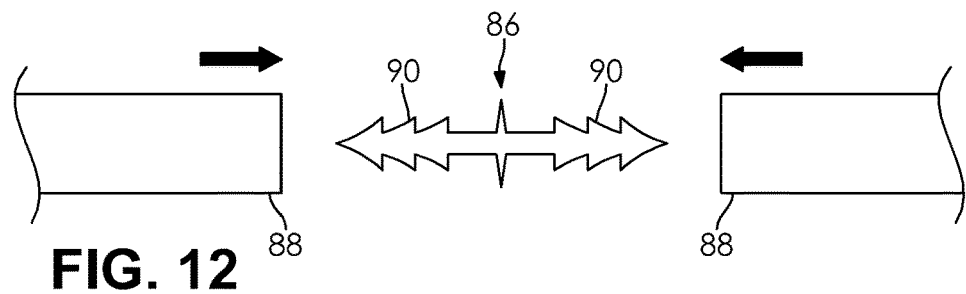
Figure 13:
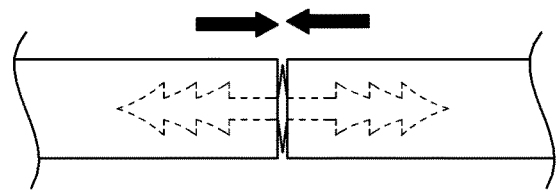
Figure 14:
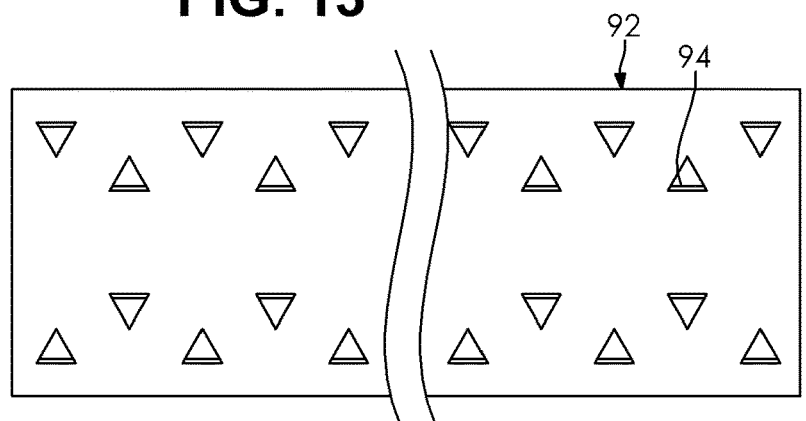
Figure 15:
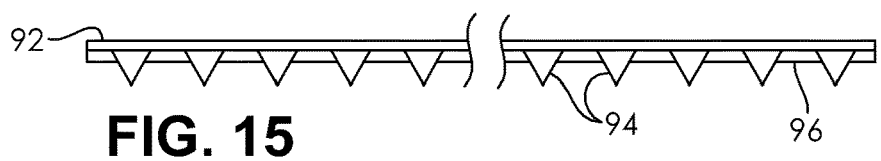
Figure 16:
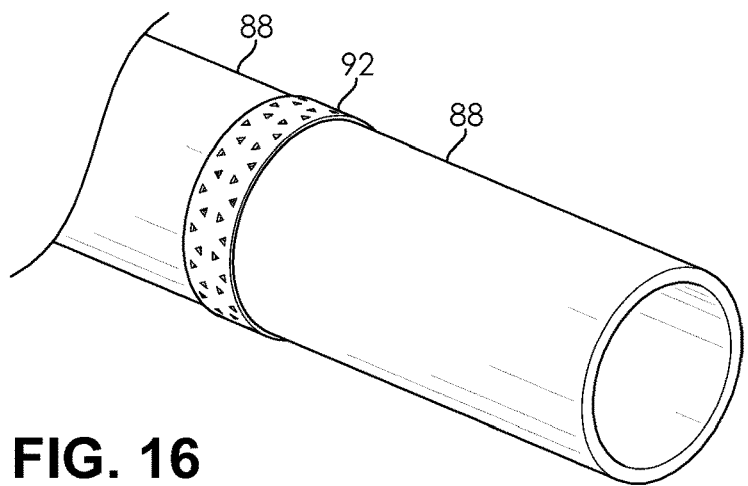
Figure 17:
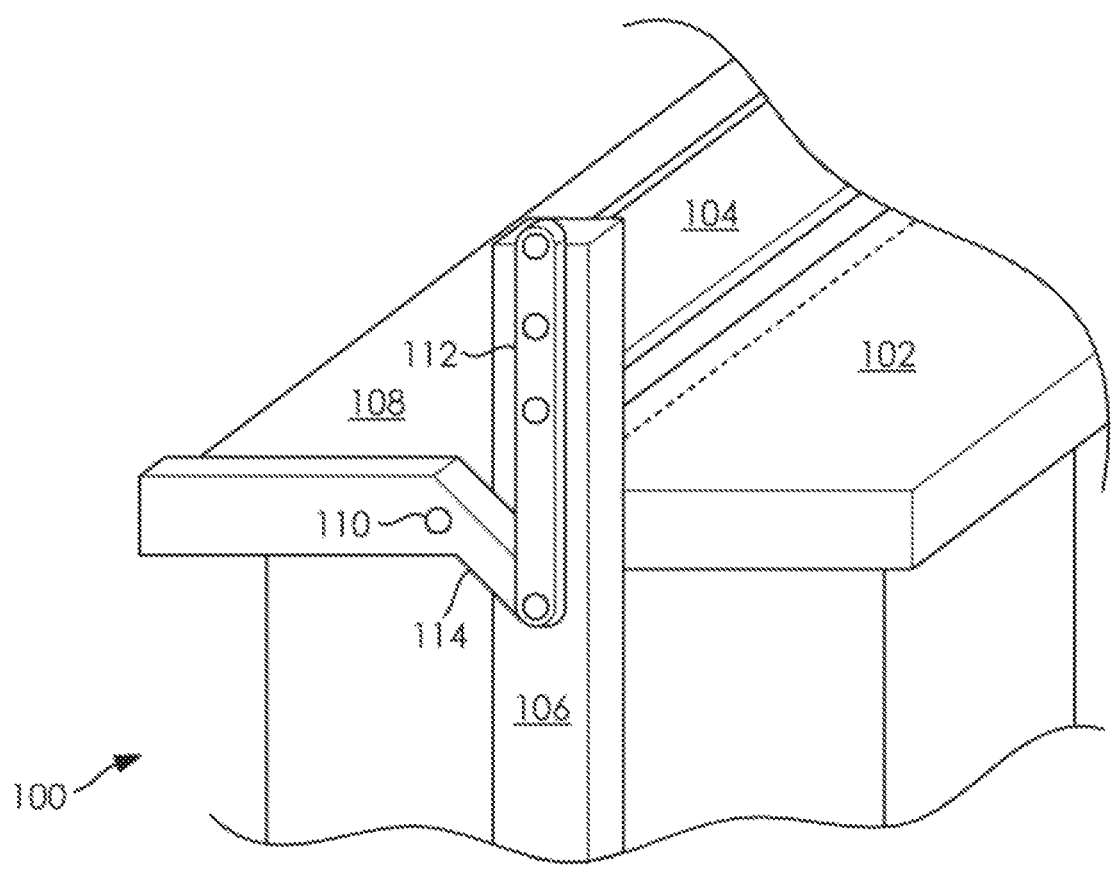
Figure 18:
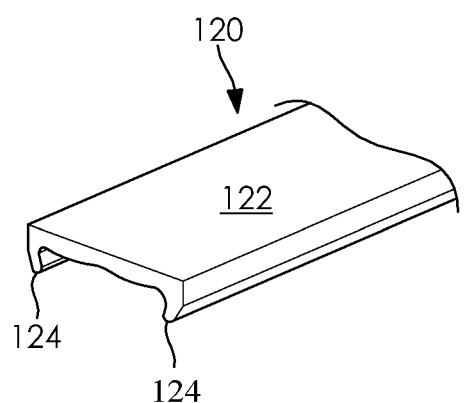

FIG. 1 is a side view of a foam insulation panel;
FIG. 2 is a side view of a crimped foam insulation panel;
FIG. 3 is a perspective view of a custom crimp bender;
FIG. 4 is a perspective view of the FIG. 3 custom crimp bender with a foam insulation panel ready to be crimped;
FIG. 5 is a perspective view of the FIG. 3 custom crimp bender after crimping of the foam insulation panel has begun;
FIG. 6 is a perspective view of the FIG. 3 custom crimp bender as a duct pre-form is exiting;
FIG. 7 is a perspective view of a stack of duct pre-forms;
FIG. 8 is a side view of a portion of a custom crimp bender showing a crimping element and an articulating bender guide;
FIG. 9 is a side view of the structure shown in FIG. 8 with the crimping element and the articulating bender guide in a different position;
FIG. 10 is an end view of duct made from the duct pre-form;
FIG. 11 is an end view of duct made from the duct pre-form; and FIG. 12 is a side view of foam panel portions of adjacent sections of duct preforms and an alignment element.
FIG. 13 is a side view of foam panel portions of adjacent sections of duct preforms after they have been pushed together so that they engage the alignment element.
FIG. 14 is a top view of a band for connecting adjacent sections of duct preforms.
FIG. 15 is a side view of the band shown in FIG. 14.
FIG. 16 is a perspective view of two adjacent duct preforms secured together by a band.
FIG. 17 is a perspective view of another example of a custom crimp bender according to the invention.
FIG. 18 is a perspective view of a band for connecting adjacent sections of duct preforms.

DETAILED DESCRIPTION OF THE INVENTION

In FIG. 1, a foam insulation panel is indicated generally at 10. The panel 10 has a first facing layer 12 on one face of the foam insulation panel 10 and a second facing layer 14 on a second face opposite the first facing layer. In FIG. 2, 16 designates the foam insulation panel 10 after it has been crimped on one face. Laterally extending indentations or crimps 18 have been formed in the surface of the foam insulation panel 10 by the action of a custom crimp bender such as the one indicated at 20 in FIGS. 3 through 6.

The crimp bender 20 has a feed table 22 for supporting a foam insulation panel indicated at 24 in FIGS. 4 and 5. Guides 26 are provided on the feed table 22 to maintain proper positioning of the foam insulation panel 24 so that it can be fed into the crimp bender 20 in the proper orientation.

The crimp bender 20 is provided with a flat plate die 28 which is shown as a smooth roller that exerts an even pressure along the bottom of the foam insulation panel 24 as it passes through the crimp bender 20. The flat plate die 28 may take the form of a roller, as shown, or a flat plate. The crimp bender 20 is provided with a crimping roll 30 which is mounted for rotation about its longitudinal axis which extends laterally with respect to the foam panel feed direction of the bender 20. The crimping roll 30 has crimping elements 32.

Panel guides 34 extend upwardly from the table 22 and serve to keep foam panels aligned before and after they are fed into the bender 20. As illustrated in FIG. 4, the foam panel is placed on the table 22. The panel 24 is fed, for example, by feed rollers (not shown) into the bender and between the flat plate die 28 and the crimping roller 30 as shown in FIG. 5. Crimps, indicated at 36, are formed in the panel 20 by the combined action of the flat plate die 28 and the crimping roller 30 which may rotate as a panel is passing between them. After a crimped panel moves out from between the flat plate die 28 and the crimping roll 30, it contacts a curved receiver 38 which supports the crimped panel in a curvilinear shape. The curved panels constitute duct preforms indicated at 40 in FIG. 7. Once the panels have been crimped, they tend to maintain their curved shape. Round duct is easily formed from the preforms by manipulating the preform into a round shape and fastening the seam.

A single crimping die may be substituted for the crimping roll 30. In any case, care must be taken to prevent damage to the facing layer that will be inside of the duct. When a crimping element impacts the foam panel, the leading portion of the panel tends to rise. However, best results are obtained when the leading portion of the panel gets a little "help" as it rises.

An articulating bender guide is indicated generally at 50 in FIGS. 8 and 9. A reciprocating crimping element 52 moves up and down, away from and towards a panel 54 under the action of a mover 56. In the retracted position shown in FIG. 8, the crimping element is spaced from the panel 54. In the extended position shown in FIG. 9, the crimping element 52 engages the panel 54 and makes a depression in the upper surface. The panel is supported during the operation on a crimp bender feeder table (not shown in FIGS. 8 and 9) corresponding with the crimp bender feeder table 22 shown in FIGS. 3 through 6.

The articulating bender guide 50 comprises an articulating platform 58 which extends across the width of the feeder table. The platform 58 is mounted on the crimp bender for pivotal movement about an axis 60. The platform articulates under the action of a mover 62 between a rest position shown in FIG. 8 to a bending position shown in FIG. 9. When the crimping element 52 is retracted, as in FIG. 8, the platform 58 is horizontal with its upper surface positioned so that it is substantially coplanar with the upper surface of the feed table. When the crimping element 52 is extended, as in FIG. 9, the platform 58 pivots to the position shown in FIG. 9 and, as it pivots, it "helps" the panel assume the shape shown in FIG. 9.

A duct preform made from a panel with evenly spaced crimps is easily assembled into a "round" duct 70 as shown in FIG. 10. The seam 72 where two edges of the preform meet can be secured with tape 74 or clips or a band or the like.

A duct preform with two sets of crimps spaced from each other is easily assembled into an oval duct 80 as shown in FIG. 11. The seam 82 where two edges of the preform meet can be secured with tape 84 or clips or a band or the like.

An alignment element for aligning the ends of duct preforms is indicated at 86 in FIGS. 12 and 13. The alignment element 86 has ends configured to be pushed into the ends of adjacent duct preforms indicated at 88. When the ends of an alignment element 86 are pushed into the foam panels of adjacent duct preforms, grippers 90 engage portions of the foam panels and resist separation of thereof. The alignment elements also serve to align adjacent duct preforms ad maintain them in alignment.

Examples of bands suitable for connecting duct preform sections are shown in FIGS. 14 through 16. A band 92 is provided with piercing elements 94 extending from a first side of the band 92. When the preforms are aligned, the band 92 is wrapped around the outside of the preforms, with the first side facing the preforms, so that some of the piercing elements 94 engage one duct preform and other ones of the piercing elements 94 engage the adjacent duct preform, as shown in FIG. 16. A liner 96 (FIG. 15) may be provided on the first side of the band 92 and may comprise tape for sealing the seam between adjacent duct preforms. The seam between adjacent duct preforms may be sealed with tape, first, followed by the wrapping of bands 92 around the seam to impart structural integrity as between adjacent duct preforms.

Another embodiment of a custom crimp bender is indicated generally at 100 in FIG. 17. A flat die 102 is supported on a bench and the flat die 102 supports a panel before and as it enters the crimping zone. A crimp die 104 and an articulating platform 108 extend across the width of the bench. The crimp die 104 is mounted on a rail 106 for reciprocating movement up and down. The articulating platform 108 "helps" bend a portion of the panel as it is crimped. The platform 108 is supported for pivotal movement about an axis 110. The crimp die 104 is connected to the platform 108 by an arm 112 that moves/reciprocates up and down with the crimp die. When the crimp die is up, as shown in FIG. 17, the platform 108 is in a down position where its upper surface is substantially coplanar with the upper surface of the flat die 102. As the crimp die 104 moves downwardly from the position shown in FIG. 17, the arm 112, which is connected to a boss 114 on the platform 108, causes the platform to pivot upwardly from the position shown in FIG. 17. The linkage can be adjusted so that the bender 100 can accommodate different thicknesses of foam panels. Only a single mover is required to move the crimp die up and down because the platform linkage translates this movement into pivoting movement of the platform 108.

Another embodiment of a band for connecting duct sections is indicated at 120 in FIG. 18. The band 120 has a central web 122 and legs 124 extending down from the central web 122. When wrapped around two duct sections that are butted together, the web extends circumferentially around the duct sections and the legs extend radially inwardly. When the band 120 is drawn tight around two adjacent duct sections, the legs 124 form an indentation in the exterior of the foam walls of the duct sections to resist and prevent relative movement between the duct sections.

I claim:

1. A method for producing curved duct sections from foam panels, said method comprising the steps of
positioning the foam panel on a table, the foam panel having a first side and a second side, the first side having facing material extending in an uninterrupted manner across the first side,
advancing the foam panel towards a crimping station having a crimping element for forming a depression in the first side of the foam panel, and
advancing the crimping element towards the first side of the foam panel, and part way into a portion of the foam panel, to form a crimp and causing the panel to bend around the crimp, while maintaining the uninterrupted facing material on the first side of the foam panel.

2. The method claimed in claim 1 wherein, during the crimping step, a portion of the panel which has moved passed the crimping element is supported on an articulating platform which pivots about an axis between a first position in which it is substantially co-planar with the table and a second position where a free edge of the articulating platform has moved towards the crimping element.

3. The method claimed in claim 2 wherein, while the crimping element is moved towards and into the first side of the foam panel, the articulating platform is pivoted from the first position towards the second position.

4. The method claimed in claim 3 wherein the pivoting axis is positioned opposite the crimping element.

5. The method for producing curved duct sections of claim 1, wherein the second side of the foam panel has a facing material that extends in an uninterrupted manner across the second side.

6. The method for producing curved duct sections of claim 5, including the step of crimping the first side and causing the panel to bend around the crimp on the first side, while maintaining the uninterrupted facing material on the second side of the foam panel.

7. The method for producing curved duct sections of claim 1, including the step of exerting an even pressure along a second side of the foam panel as the foam panel passes under the crimping element.

8. The method for producing curved duct sections of claim 7, wherein the even pressure is exerted by the articulating platform.

9. The method for producing curved duct sections of claim 1, wherein the crimping element is a die.

10. The method for producing curved duct sections of claim 1, wherein the crimping element is a roller configured with a plurality of dies.

11. The method for producing curved duct sections of claim 1, including the step of receiving the crimped and bent foam panel in a curved receiver.

12. A method for producing an insulated portion of duct having one or more rounded portions formed from one or more curved duct sections, the method comprising the steps of:
    forming curved duct sections from a foam panel with a crimping station having a crimping element, the foam panel having a first side and a second side, the first side having facing material extending in an uninterrupted manner across the first side, the crimping station configured for forming a depression in the first side of the foam panel and causing the panel to bend around the crimp, while maintaining the uninterrupted facing material on the first side of the foam panel;
    joining one or more curved duct section together, thereby forming seams between opposing edges of the joined curved duct sections; and
    sealing the seams.

13. The method claimed in claim 12, including the step of supporting a portion of the panel which has moved passed the crimping element on an articulating platform, the articulating platform configured to pivot about an axis between a first position in which it is substantially co-planar with the foam panel before it is crimped and a second position where a free edge of the articulating platform has moved towards the crimping element.

14. The method claimed in claim 13, including the simultaneous steps of moving the crimping element in a direction towards the first side of the foam panel and pivoting the articulating platform from the first position towards the second position.

15. The method claimed in claim 14, including the step of positioning the pivoting axis opposite the crimping element.

16. The method claimed in claim 12, wherein the second side of the foam panel has a facing material that extends in an uninterrupted manner across the second side.

17. The method claimed in claim 16, including the step of crimping the first side and causing the panel to bend around the crimp on the first side, while maintaining the uninterrupted facing material on the second side of the foam panel.

18. The method claimed in claim 12, including the step of receiving the formed curved duct sections in a curved receiver.

\* \* \* \* \*